US008277306B2

(12) United States Patent
Yoshizawa

(10) Patent No.: US 8,277,306 B2
(45) Date of Patent: Oct. 2, 2012

(54) GAMING MACHINE

(75) Inventor: Kazumasa Yoshizawa, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1063 days.

(21) Appl. No.: 12/589,517

(22) Filed: Sep. 4, 2008

(65) Prior Publication Data

US 2010/0056255 A1 Mar. 4, 2010

(51) Int. Cl.
*A63F 13/00* (2006.01)
*A63F 13/10* (2006.01)

(52) U.S. Cl. ................ 463/20; 463/16; 463/22; 463/25; 463/29; 273/138.1; 273/139

(58) Field of Classification Search .............. 463/10–13, 463/16, 20–22, 25, 29, 40–42; 273/138.1, 273/139, 142 B, 142 A, 142 J, 148 A, 149 P, 273/149 R, 243, 292–293, 304, 306, 309; *A63F 13/00, 13/10*
See application file for complete search history.

(56) References Cited

U.S. PATENT DOCUMENTS

| | | | | |
|---|---|---|---|---|
| 5,910,048 | A | 6/1999 | Feinberg | |
| 6,113,493 | A * | 9/2000 | Walker et al. | 463/25 |
| 6,874,783 | B2 * | 4/2005 | Higginson | 273/269 |
| 7,722,047 | B2 * | 5/2010 | Walker et al. | 273/292 |
| 7,887,410 | B2 * | 2/2011 | Okada | 463/20 |
| 8,021,225 | B2 * | 9/2011 | Okada | 463/20 |
| 2006/0128461 | A1 * | 6/2006 | Okada | 463/25 |
| 2006/0205495 | A1 * | 9/2006 | Fujimoto | 463/29 |
| 2007/0105621 | A1 * | 5/2007 | Okada | 463/29 |
| 2007/0105622 | A1 * | 5/2007 | Okada | 463/29 |
| 2008/0119259 | A1 * | 5/2008 | Okada | 463/20 |
| 2008/0119262 | A1 * | 5/2008 | Okada | 463/20 |
| 2008/0200227 | A1 * | 8/2008 | Okada | 463/11 |
| 2010/0285869 | A1 * | 11/2010 | Walker et al. | 463/25 |

* cited by examiner

*Primary Examiner* — Arthur O. Hall
(74) *Attorney, Agent, or Firm* — KMF Patent Services, PLLC; Kenneth M. Fagin, Esq.

(57) ABSTRACT

A gaming machine of the present invention allows an insurance function to be set in a game, based upon an operation of a player. Among games in which plural types of symbols are rearranged on a display device every game execution in which the insurance function is effective, an accumulative value stored in a memory is updated so as to increase. As a result of repeating the game in which the insurance function is effective, where the accumulative value has reached a predetermined value for activating the insurance function, it is judged whether a payout of a preset value for insurance and an execution of a special game has been selected, according to an operation of a selection input section by a player. Either of the payout of the preset value for the insurance and the execution of the special game is performed, based upon a result of the judgment.

8 Claims, 16 Drawing Sheets

FIG.3

SYMBOL ARRANGEMENT TABLE

| CODE NO. | SYMBOLS | SYMBOLS | SYMBOLS | SYMBOLS | SYMBOLS |
|---|---|---|---|---|---|
| 00 | EARTH | JUPITER | SATURN | VENUS | MARS |
| 01 | A | EARTH | JUPITER | SATURN | VENUS |
| 02 | Q | A | EARTH | JUPITER | SATURN |
| 03 | J | Q | A | EARTH | JUPITER |
| 04 | K | J | Q | A | EARTH |
| 05 | SUN | K | J | Q | A |
| 06 | MERCURY | SUN | K | J | Q |
| 07 | MARS | MERCURY | SUN | K | J |
| 08 | VENUS | MARS | MERCURY | SUN | K |
| 09 | SATURN | VENUS | MARS | MERCURY | SUN |
| 10 | JUPITER | SATURN | VENUS | MARS | MERCURY |
| 11 | EARTH | JUPITER | SATURN | VENUS | MARS |
| 12 | A | EARTH | JUPITER | SATURN | VENUS |
| 13 | Q | A | EARTH | JUPITER | SATURN |
| 14 | J | Q | A | EARTH | JUPITER |
| 15 | K | J | Q | A | EARTH |
| 16 | SUN | K | J | Q | A |
| 17 | MERCURY | SUN | K | J | Q |
| 18 | MARS | MERCURY | SUN | K | J |
| 19 | VENUS | MARS | MERCURY | SUN | K |
| 20 | SATURN | VENUS | MARS | MERCURY | SUN |
| 21 | JUPITER | SATURN | VENUS | MARS | MERCURY |

FIG.4

SCATTER PRIZE PAYMENT TABLE

| SYMBOLS | NUMBER OF DISPLAYED SYMBOLS | | |
|---|---|---|---|
| | THREE | FOUR | FIVE |
| A | 2 | 4 | 6 |
| J | 4 | 8 | 12 |
| K | 6 | 12 | 18 |
| Q | 8 | 16 | 24 |
| MERCURY | 10 | 20 | 30 |
| MARS | 20 | 40 | 60 |
| VENUS | 30 | 60 | 100 |
| SUN | 40 | 80 | 120 |
| SATURN | 50 | 100 | 200 |
| JUPITER | 70 | 140 | 280 |
| EARTH | TRIGGER SYMBOL FOR SPECIAL PRIZE (BONUS_IN) | | |

* NUMBER OF COINS PAID OUT AS PER ONE COIN INSERTION

GAMING MACHINE

BACKGROUND OF THE INVENTION

1. Field of the Invention

The present invention relates to a gaming machine, and in particular, to a gaming machine in which a player can select a payout description of insurance.

2. Description of the Related Art

Conventionally, in gaming machines, players can play games while intentionally enabling or disabling the payout of insurance. In a case where the payout of insurance is enabled, even if the players have consumed a number of gaming mediums after play of the games over a long period of time, for example, the payout of the insurance is performed for the player if the players perform games until a predetermined setting has been reached. An example of such gaming machines is disclosed in U.S. Pat. No. 5,910,048.

The present invention provides a gaming machine with entertainability beyond the above-described related art.

SUMMARY OF THE INVENTION

A first aspect of the present invention is directed to a gaming machine, comprising: (i) a display device on which plural types of symbols are arranged; (ii) an insurance input section for setting an insurance function in a game; (iii) a selection input section for a player to make a predetermined selection; (iv) a memory which stores an accumulative value accumulated every game execution and a predetermined value for activating the insurance function; and (v) a controller, the controller being configured to: (a) accept an insurance function setting request in the game, based upon an input from the insurance input section; (b) rearrange the plural types of symbols on the display device; (c) update the accumulative value stored in the memory so as to increase; (d) judge whether a payout of a preset value for insurance and an execution of a special game has been selected, in response to an input from the selection input section by the player, in a case where the accumulative value stored in the memory so as to be accumulatively updated on a game-by-game basis has reached the predetermined value for activating the insurance function, as a result of repeating the processes (b) and (c) on the game-by-game basis; and (e) perform either of the payout of the preset value for the insurance and the execution of the special game, based upon a result of the judgment in the process (d).

According to the first aspect of the present invention, a player can select whether to obtain a predetermined amount of insurance or to obtain a profit greater than the predetermined amount of insurance by performing a sub game when a predetermined condition for activating an insurance function is met. In this manner, the entertainability in playing games can be enhanced.

A second aspect of the present invention is directed to the gaming machine according to the first aspect, wherein: the special game is included as one of a plurality of special games, and wherein: in a case where it is judged, in the process (e), that the execution of the special game has been selected, as a result of the judgment in the process (d), the controller determines whether to execute a predetermined special game from among the plurality of special games, in response to the input from the selection input section by the layer, and executes a process of executing the determined special game.

According to the second aspect of the present invention, plural types of special games as a means for obtaining a profit based upon an insurance function are provided, thus allowing a player desiring to execute a special game to select one of the plural types of special games. In this manner, the player can select, by oneself, a special game which is expected to obtain the greatest profit based upon an insurance function, thus allowing the player to raise expectation based upon the insurance function more.

A third aspect of the present invention is directed to the gaming machine according to claim 1, wherein: the selection input section includes a selection input screen prompting the player to make a predetermined selection, and wherein: in a case where it is judged that the accumulative value stored in the memory so as to be accumulatively updated on the game-by-game basis has reached a predetermined value, as a result of the judgment in the process (d), the controller causes the display device to display a selection input screen prompting the player to select either of payout of the preset value for the insurance and the execution of the special game, and executes the process (e), based upon a selection input by the player from the selection input screen.

According to the third aspect of the present invention, a player selects whether to payout a predetermined value or to execute a special game by operating a selection input section. When a screen for selecting either of the above items is displayed on a display device, the player can make a selection based upon this display. Therefore, the player can easily select whether to pay out the predetermined value or to execute the special game, without losing entertainability.

A fourth aspect of the present invention is directed to a gaming machine, comprising: (i) a display device on which plural types of symbols are arranged; (ii) an insurance input section for setting an insurance function in a game; (iii) a selection input section for a player to make a predetermined selection; (iv) a memory which stores a number of games to be accumulated every game execution and a predetermined number of games for activating the insurance function; and (v) a controller, the controller being configured to: (a) accept an insurance function setting request in the game, based upon an input from the insurance input section; (b) rearrange the plural types of symbols on the display device; (c) update the accumulative value stored in the memory so as to increase; (d) judge whether a payout of a preset value for insurance and an execution of a special game has been selected, in response to an input from the selection input section by the player, in a case where the number of games stored in the memory has reached the predetermined number of games for activating the insurance function, as a result of repeating the processes (b) and (c) on a game-by-game basis; and (e) perform either of the payout of the preset value for the insurance and the execution of the special game, based upon a result of the judgment in the process (d).

According to the fourth aspect of the present invention, when a game in which an insurance function is enabled has been performed a predetermined number of times, a player can select whether to obtain a predetermined amount of insurance or to try to obtain a profit greater than the predetermined amount of insurance by performing a sub game. Therefore, a timing with which a profit based upon an insurance function can be obtained becomes clear, thus allowing the player to enjoy a game at ease.

A fifth aspect of the present invention is directed to the gaming machine according to the fourth aspect, wherein: the special game is included as one of a plurality of special games, and wherein: in a case where it is judged, in the process (e), that the execution of the special game has been selected, as a result of the judgment in the process (d), the controller determines whether to execute a predetermined special game from among the plurality of special games, in response to the input from the selection input section by the player, and executes a process of executing the determined special game.

According to the fifth aspect of the present invention, plural types of special games as a means for obtaining a profit based upon an insurance function are provided, allowing a player desiring to execute a special game to select one of the plural types of special games. In this manner, the player can select, by oneself, a special game which is expected to obtain the greatest profit based upon an insurance function, thus allowing the player to raise expectation based upon the insurance function more.

A sixth aspect of the present invention is directed to the gaming machine according to claim 4, wherein: the selection input section includes a selection input screen prompting the player to make a predetermined selection, and wherein: in a case where it is judged that the accumulative value stored in the memory so as to be accumulatively updated on the game-by-game basis has reached a predetermined value, as a result of the judgment in the process (d), the controller causes the display device to display a selection input screen prompting the player to select either of payout of the preset value for the insurance and the execution of the special game, and executes the process (e), based upon a selection input by the player from the selection input screen.

According to the sixth aspect of the present invention, a player selects whether to payout a predetermined value or to execute a special game by operating a selection input section. When a screen for selecting either of them is displayed on a display device, the player can make a selection based upon this display. Therefore, the player can easily select whether to pay out the predetermined value or to execute the special game, without losing entertainability.

A seventh aspect of the present invention is directed to a gaming machine, comprising: (i) a display device on which plural types of symbols are arranged and which includes a selection input screen causing a player to make a predetermined selection; (ii) an insurance input section for setting an insurance function in a game; (iii) a memory which stores an accumulative value accumulated every game execution and a predetermined value for activating the insurance function; and (iv) a controller, the controller being configured to: (a) accept an insurance function setting request in the game, based upon an input from the insurance input section; (b) cause the display device to display a selection input screen prompting the player to select either of payout of a preset value for insurance and execution of a special game; (c) store in the memory an input result selectively input by the player from the selection input screen; (d) rearrange the plural types of symbols on the display device; (e) update the accumulative value stored in the memory so as to increase; (f) judge whether or not the accumulative value stored in the memory so as to be accumulatively updated on a game-by-game basis has reached a predetermined value for activating the insurance function, as a result of repeating the processes (d) and (e) on the game-by-game basis; and (g) in a case where the accumulative value has reached the predetermined value, as a result of the judgment in the process (f), refer to the input result by request of the player stored in the memory in the process (c), and, based upon the input result, perform either of the payout of the preset value for the insurance and the execution of the special game.

According to the seventh aspect of the present invention, a player can select whether to obtain a predetermined amount of insurance or to obtain a profit greater than the predetermined amount of insurance by performing a sub game when a predetermined condition for activating an insurance function is met. In this manner, the entertainability in playing games can be enhanced. Further, a screen for selecting the payout of a predetermined value or the execution of a special game is displayed on a display device. A player can then make a selection, based upon this display. Therefore, the player can easily select the payout of the predetermined value or the execution of the special game, without losing entertainability.

An eighth aspect of the present invention is directed to the gaming machine according to the seventh aspect, wherein: the special game is included as one of a plurality of special games, and wherein: in a case where it is judged, in the process (g), that the input result by the request of the player stored in the memory in the process (c) is the execution of the special game, the controller determines whether to execute a predetermined special game from among the plurality of special games, in response to the input from the selection input section by the player, and performs a process of executing the determined special game.

According to the eighth aspect of the present invention, plural types of special games as a means for obtaining a profit based upon an insurance function are provided, thus allowing a player desiring to execute a special game to select one of the plural types of special games. In this manner, the player can select, by oneself, a special game which is expected to obtain the greatest profit based upon an insurance function, thus allowing the player to raise expectation based upon the insurance function more.

BRIEF DESCRIPTION OF THE DRAWINGS

FIG. 3 is a view for explaining a symbol arrangement table;

FIG. 4 is a view for explaining a scatter prize payment table;

DESCRIPTION OF THE PREFERRED EMBODIMENTS

Figure 1:
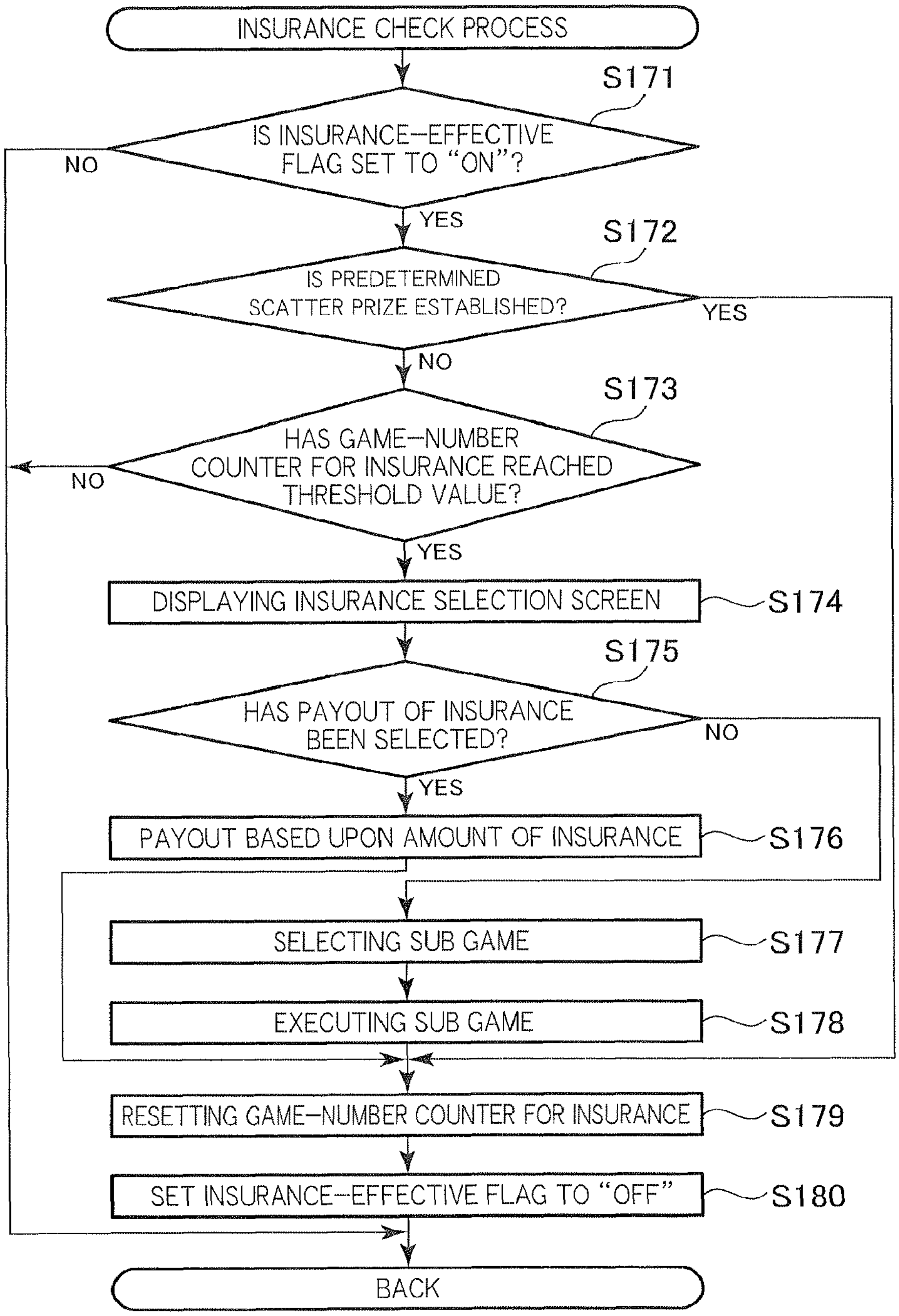
FIG. 1 is a flowchart showing a subroutine of an insurance check process.

Hereinafter, embodiments of the present invention will be described, referring to the drawings. FIG. 1 is a flowchart showing a subroutine of an insurance check process.

First, a main CPU 71 included in a slot machine 1 as a gaming machine of the embodiment is intended to rearrange a plurality of symbols on a display device. When the number of rearranged symbols corresponds to awarding a predetermined scatter prize, the main CPU 71 performs a game pertinent to payout or the like of coins whose number corresponds to a type of the corresponding scatter prize. When a player enables an insurance function, the main CPU 71 monitors whether or not the number of games in which the insurance function is enabled has reached a predetermined value (S172, S173) in a state in which a predetermined scatter prize, i.e., a "BONUS GAME" or a "JACKPOT" is not established.

Upon judging that the number of games in which the insurance function is enabled has reached a predetermined value in a state in which the "BONUS GAME" or the "JACKPOT" is not established, the main CPU 71 causes a display device to display a screen prompting a player to select which of "payout of insurance" and "execution of a sub game" is performed (S174). After the player has made a selection, the main CPU 71 judges the selected process (S175).

Upon judging that the payout of insurance has been selected, the main CPU 71 performs a process of coin-out, based upon an amount of insurance as a predetermined payout (S176). Upon judging that execution of a sub game as a special game has been selected, the main CPU 71 causes the display device to display a screen prompting the player to select any one from among a plurality of sub games (S177).

After that, the main CPU 71 performs a process of executing the sub game selected by the player (S178), and performs a coin-out process, for example, based upon an outcome of the sub game. The main CPU 71 resets the number of games in which the insurance function is enabled (S179), and disables the insurance function (S180).

As described above, according to the present invention, when a predetermined condition for activating the insurance function is met, the player can select whether to obtain a predetermined amount of insurance or obtain a profit greater than the amount of insurance by performing a sub game. In this manner, the entertainability in the play of the game can be enhanced.

Figure 2:
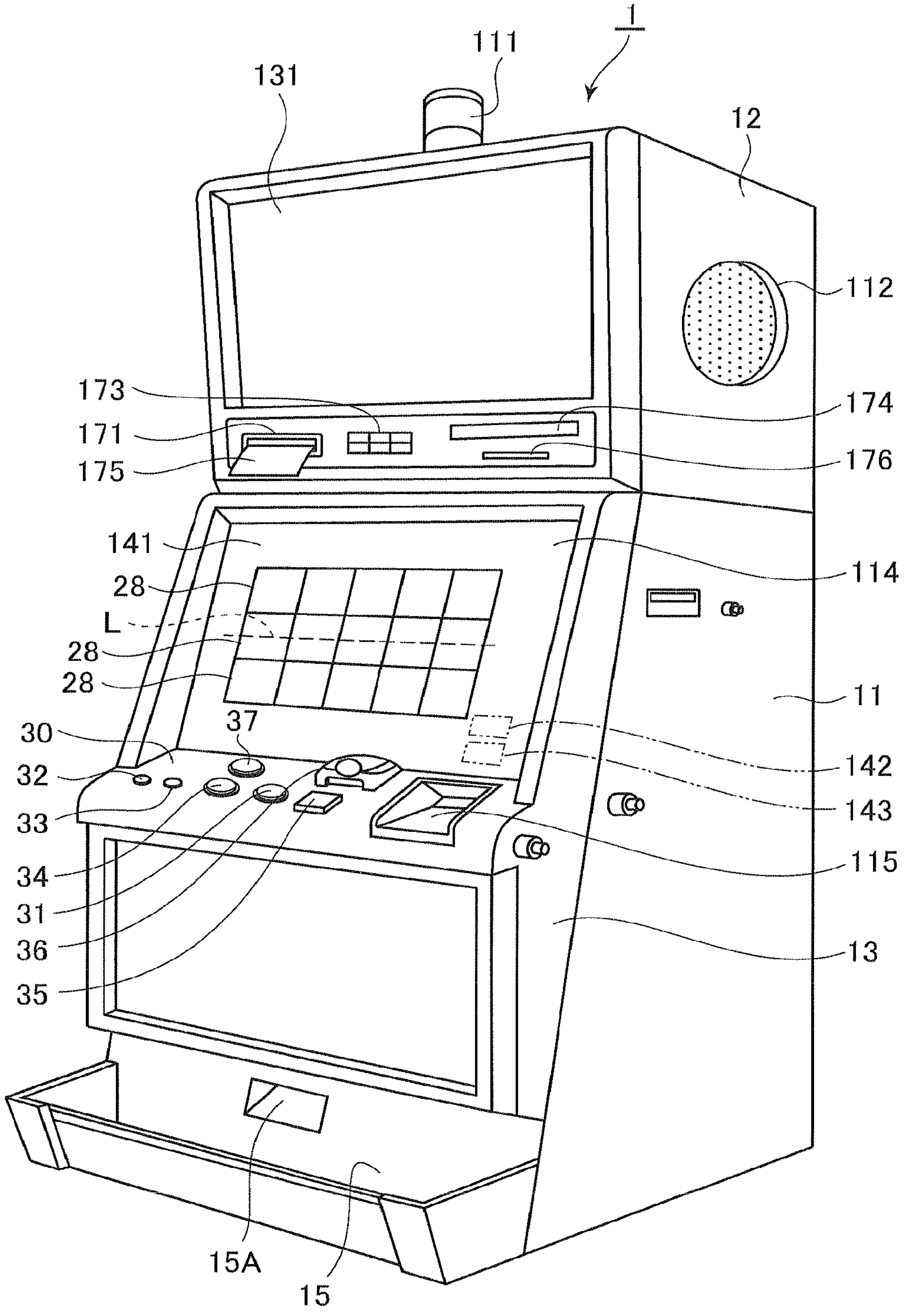
FIG. 2 is a perspective view showing an appearance of a slot machine.

Next, a configuration of a respective one of the slot machines 1 in the embodiment will be described. FIG. 2 is a perspective view showing an appearance of a slot machine.

A coin, a bill, or electrically valuable information corresponding thereto is used as a game medium in the gaming machine 1. Further, in the present embodiment, a barcode-attached ticket to be described later is also employed. It is to be noted that the game medium is not limitative thereto, and for example a medal, token, electric money or the like can be employed.

The slot machine 10 is provided with: a cabinet 11; a top box 12 which is installed at an upper side of the cabinet 11; and a main door 13 which is provided on a front face of the cabinet 11.

A lower image display panel 141 is provided at the center of the main door 13. The lower image display panel 141 is provided with a transparent liquid crystal display panel, and 15 display blocks in 5 columns and 3 lines are displayed. A single symbol is displayed in each of the display block 28. The lower image display panel 141 is equivalent to a display device according to the present invention.

A credit amount display section 142 and a payout amount display section 143 are set on the lower image display panel 141. The credit amount display section 142 displays the number of credited coins by way of image. At the payout display portion 143, the number of coins is displayed by way of image, the coins being paid out in a case where symbols of the same type are displayed in a stopped manner by a predetermined number or more in the display blocks 28.

Further, a touch panel 114 as a selection input section is provided on a front face of the lower image display panel 141, so that a player can input a variety of instructions by operating a touch panel 114.

Downwardly of the lower image display panel 141, there are provided: a control panel 30 which is made up of a plurality of buttons 31 to 35 for a player to input an instruction associated with the progress of a game; a coin acceptance opening 36 for accepting a coin in a cabinet 11; and a bill validator 115.

On a control panel 30, there are provided; a SPIN button 31; a CHANGE button 32; a CASHOUT button 33; a 1-BET button 34; a MAX-BET button 35; and an insurance BET button as an insurance input section. The SPIN button 31 is intended to enter an instruction for starting scroll-display of symbols. A change button 32 is used at the time of requesting a game facility staff member to exchange money. The CASHOUT button 33 is intended to enter an instruction for paying out credited coins to the coin tray 15.

The 1-BET button 34 is intended to input an instruction of inserting one of credited coins in the play of a game. The MAX-BET button 35 is intended to input an instruction of inserting the maximum number of credited coins that can be inserted in the play of one game (50 coins in the embodiment). The 1-BET button 34 and the MAX-BET button 35 are BET buttons for starting a game.

An insurance BET button 37 as an insurance input section is intended to input an instruction of inserting a predetermined number of credited coins (for example, 10 coins) for the purpose of enabling the insurance function. Unlike the BET buttons 34, 35 for starting a game, insertion for enabling the insurance function by the insurance BET button 37 is arbitrarily performed by a player. In the embodiment, the insurance BET button 37 is operated in each game, the amount of insurance, $1.00, is subtracted from the credit stored in a RAM 73 in such each game. In a case where the accumulated number of games, in which an insurance BET is placed, has reached a predetermined number of games (for example, 300 times), a player selects whether to pay out a predetermined number of coins (for example, 200 coins) as the payout of insurance or perform a sub game.

A bill validator 115 is provided to accept bills. The bill validator 115 validates a bill, and accepts a valid bill into the cabinet 11. The bill validator 115 may be configured so as to be capable of reading a barcode-attached ticket 175 to be described later.

On a front face of a top box 12, an upper image display panel 131 including a liquid crystal panel is provided. The upper image display panel 131 displays an effect-related image or an image presenting introduction of the contents of a game or an explanation of rules of the game. Further, the top box 12 is provided with a speaker 112 and a lamp 111. In the gaming machine 1, effect rendering is executed in accordance with image display, sound output, light output, or a combination thereof.

A ticket printer 171, a card slot 176, a data display 174, and a keypad 173 are provided downwardly of the upper image display panel 131.

The ticket printer 171 prints on a ticket a barcode representing encoded data of the number of credits, date, the identification number of the gaming machine 1, and the like, and outputs the ticket as the ticket 175 with a barcode. A player can cause a gaming machine to read a barcode-attached ticket 175 for the play of a game or can exchange the barcode-attached ticket 175 with bills or the like at a predetermined site of a gaming facility (for example, cashier in casino).

The card slot 176 is for inserting a card in which predetermined data is stored. For example, data for identifying a player or data pertinent to the history of games performed by the player is stored in the card.

When the card is inserted into the card slot 176, a card reader 172 to be described later reads/writes data from/into the card. The card may store data corresponding to a coin, a bill or a credit.

A data display 174 is made up of a fluorescent display or an LED, and is intended to display data read by a card reader 172 or data input by the player via a keypad 173. The keypad 173 is for inputting a command and data related to issuance of tickets or the like.

Next, a symbol arrangement table will be described. FIG. 3 is a view for explaining a symbol arrangement table. As shown in FIG. 3, each column of a total of 22 symbols made up of code numbers "00" to "21" is displayed in a scrolling manner in each of the display blocks 28. Each column of the symbols is constituted so that symbols "EARTH", "JUPITER", "SATURN", "SUN", "VENUS", "MARS", "MERCURY", "K", "J", "Q", and "A" are arranged in combination. These symbols are all scatter symbols.

Next, a description of the scatter prize will be given. FIG. 4 is a view for explaining a scatter prize payment table. Symbols "JUPITER", "SATURN", "SUN", "VENUS", "MARS", "MERCURY", "K", "J", "Q", and "A" are trigger symbols for the scatter prize. In a case where three or more same types of these symbols are displayed (rearranged) in a stopped state in any of the display blocks of the lower image display panel 141, a predetermined number of coins are paid out as a scatter prize in accordance with the types or number of symbols and the number of BETs. For example, if three, four, or five "JUPITER" symbols are displayed in a stopped state in any of the display blocks 28 respectively, 70, 140, or 280 coins are paid out. (The number of coin-outs is computed as per one coin insertion.)

Hereinafter, a description of the "EARTH" symbol will be furnished. The "EARTH" symbol is a trigger symbol for a bonus game. In a case where the "EARTH" symbols are displayed (rearranged) in a stopped state by three or more in any of the display blocks 28 of the lower image display panel 141, a bonus game is started. In other words, the "EARTH" symbols are displayed (rearranged) in a stopped state by three or more in any of the display blocks 28 of the lower image display panel 141, whereby a bonus game trigger is established.

Figure 5:
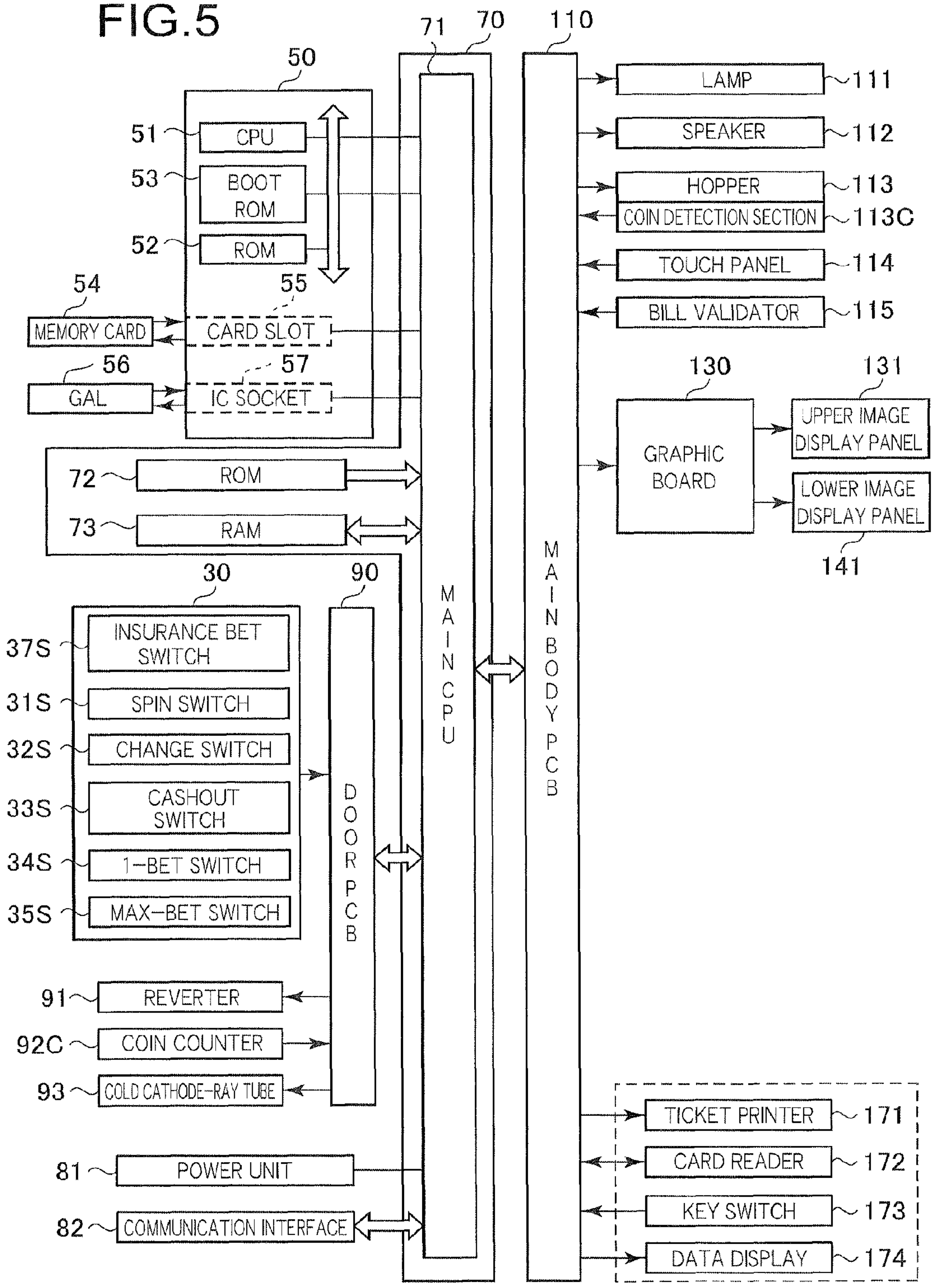
FIG. 5 is a block diagram depicting an internal configuration of the slot machine.

Next, an internal configuration of the slot machine will be described. FIG. 5 is a block diagram depicting an internal configuration of the slot machine. A gaming board 50 is provided with: a CPU 51, a ROM 52, and a boot ROM 53 which are interconnected by means of an internal bus; a card slot 55 corresponding to a memory card 54; and an IC socket 57 corresponding to a GAL (Generic Array Logic) 56.

The memory card 54 includes a non-volatile memory, and stores game programs and a game system program. The game programs include a program pertinent to the progress of a game; a scatter prize determination program; and a program for executing effect rendering with image(s) or sound(s). The scatter prize determination program is intended to determine symbols to be rearranged in any of the display blocks 28 (as shown in FIG. 3, these symbols may be referred to as the corresponding code numbers).

The abovementioned scatter prize determination program includes symbol-weighted data corresponding to a respective one of plural types of payout rates (for example, 80%, 84%, 88%). The symbol-weighted data is intended to specify random number values when symbols are determined according to any of the display blocks 28.

Further, the card slot 55 is configured so that the memory card 54 can be inserted thereinto and removed therefrom, and is connected to a motherboard 70 by means of an IDE bus.

The GAL 56 is one type of a PLD (Programmable Logic Device) having an OR-fixed type arrayed structure. The GAL 56 is provided a plurality of input ports and output ports. If a predetermined input occurs with any of the input ports, the corresponding data is output from any of the output ports.

Further, the IC socket 57 is configured so that the GAL 56 can be inserted thereinto and removed therefrom, and is connected to the motherboard 70 by means of a PCI bus. The characteristics or contents of a game to be performed at the gaming machine 1 can be varied by replacing the memory card 54 with that having another program written therein, or alternatively, by rewriting the program written in the memory card 54 into another one.

The CPU 51, the ROM 52 and the boot ROM 53 mutually connected by the internal bus are connected to the motherboard 70 by means of a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like.

The authentication program is a program (tamper check program) for authenticating the game program and the game system program. The pre-authentication program is a program for authenticating the aforementioned authentication program. The authentication program and the pre-authentication program are written along a procedure for authenticating that the program to be the subject has not been tampered (authentication procedure).

The motherboard 70 is provided with: a main CPU 71 as a controller; a ROM 72; a RAM 73 as a memory; and a communication interface 82.

The ROM 72 includes a memory device such as a flash memory, and stores a program such as BIOS to be executed by the main CPU 71, and permanent data. When the main CPU 71 executes a BIOS, a process of initializing predetermined peripherals is performed. Further, a process of capturing the game programs and game system program stored in the memory card 54 is started via the gaming board 50.

The RAM 73 stores data and programs which are used in operation of the main CPU 71. For example, when the process of loading the aforementioned game program, game system program or authentication program is conducted, the RAM 73 can store these programs. The RAM 73 is provided with working areas used for operations in execution of these programs. For example, an area of storing a counter which manages the number of games, the number of BETs, the number of coin-outs, and the amount of credit; and/or an area of storing determined symbols (code numbers) are/is provided. Further, in the embodiment, in the RAM 73, there are provided: an area for accumulatively storing the number of games performed by enabling the insurance function; and/or an area of storing a predetermined number of games performed when the insurance function is activated. Furthermore, the RAM 73 stores a variety of flags such as an insurance-effective flag indicative of whether or not the insurance function is enabled.

The communication interface 82 is intended to make communication with an external control unit such as a server, via a communication line. A door PCB 90 and a main body PCB (Printed Circuit Board) 110 to be described latter are connected to the motherboard 70 by means of a USB, respectively. Further, the motherboard 70 is connected to a power unit 81.

When the power is supplied from the power unit 81 to the motherboard 70, the main CPU 71 of the motherboard 70 is activated, and the power is then supplied to the gaming board 50 through the PCI bus so as to activate the CPU 51.

The door PCB 90 and the body PCB 110 are connected to input devices such as a switch and a sensor, and peripheral devices, the operations of which are controlled by means of the main CPU 71.

A control panel 30, a reverter 91, a coin counter 92C and a cold cathode tube 93 are connected to the door PCB 90.

On the control panel 30, a SPIN switch 31S, a CHANGE switch 32S, a CASHOUT switch 33S, a 1-BET switch 34S, a MAX-BET switch 35S, and an insurance BET switch 37S, which correspond to the aforementioned buttons, are provided. Each of the switches detects that the corresponding button has been depressed by a player, and outputs a signal to the main CPU 71.

The coin counter 92C validates a coin inserted into the coin accepting slot 36 based on its material, shape and the like, and outputs a signal to the main CPU 71 upon detection of a valid coin. Further, an invalid coin is ejected from the coin-out opening 15A.

The reverter 91 operates based on a control signal outputted from the main CPU 71, and distributes valid coins validated by the coin counter 92C into a hopper 113 or a cash box (not illustrated). That is, coins are distributed into the hopper 113 when the hopper 113 is not filled with coins, while coins are distributed into the cash box when the hopper 113 is filled with coins.

A cold cathode-ray tube 93 serves as a backlight installed on the rear side of the lower and upper image display panels 141 and 131, and illuminates based upon a control signal output from the main CPU 71.

The body PCB 110 is connected to the lamp 111, the speaker 112, the hopper 113, a coin detecting portion 113S, the touch panel 114, the bill validator 115, a graphic board 130, the ticket printer 171, the card reader 172, a key switch 173S and the data display 174.

The lamp 111 lights up based on a control signal outputted from the main CPU 71. The speaker 112 outputs sounds such as BGM, based on a control signal outputted from the main CPU 71.

The hopper 113 operates based upon the control signal output from the main CPU 71, and pays out a specified number of coin-outs from the coin-out opening 15A to a coin tray 15. The coin detecting portion 113S detects the coins paid out by the hopper 113, and outputs a signal to the main CPU 71.

A touch panel 114 as a selection input section detects a position of a site touched by a player's finger or the like, and outputs to the main CPU 71 a position signal corresponding to the detected position. In particular, in the embodiment, if the number of games in which insurance is enabled has reached a predetermined value, a player is prompted to select which of "payout of insurance" and "execution of a sub game" is performed, with the use of a touch panel. Further, when the execution of the sub game has been selected, the player is prompted to select any one from among a plurality of sub games, with the use of the touch panel.

Upon acceptance of a valid bill, the bill validator 115 outputs to the main CPU 71 a signal corresponding to the face amount of the bill.

The graphic board 130 controls display of images conducted by the respective upper image display panel 131 and lower image display panel 141, based on a control signal outputted from the main CPU 71. The graphic board 130 is provided with a VDP generating image data, a video RAM temporarily storing the image data generated by the VDP and the like.

Based on a control signal outputted from the main CPU 71, the ticket printer 171 prints on a ticket a barcode representing encoded data of the number of credits stored in the RAM 73, date, the identification number of the gaming machine 1, and the like, and then outputs the ticket as the ticket 175 with a barcode.

The card reader 172 reads data stored in a card inserted into the card slot 176 and transmits the data to the main CPU 71, or writes data into the card based on a control signal outputted from the main CPU 71.

A key switch 173S is provided on a keypad 173, and outputs a predetermined signal to the main CPU 71 when a player has operated the keypad 173.

A data display 174 displays data read by a card reader 172 or data input by a player via the keypad 173, based upon the control signal output from the main CPU 71.

The description of the symbol combination table has now been completed. Next, programs to be executed by the slot machine 1 will be described referring to FIGS. 6 to 16. The main CPU 71 of the slot machine 1 conducts a game by reading and executing a game program.

Figure 6:
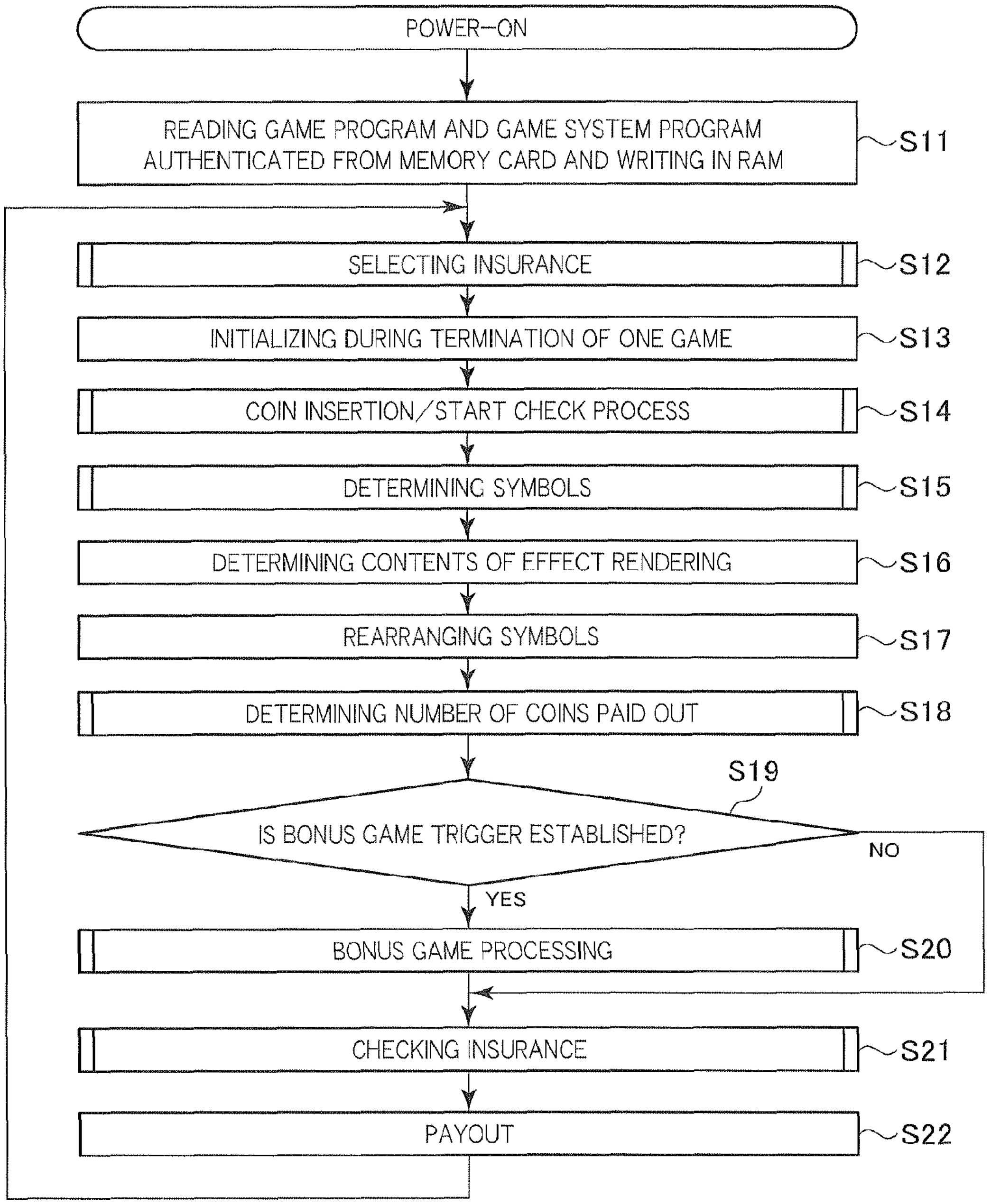
FIG. 6 is a flowchart showing a routine of main processing of the slot machine.

First, a description of main processing will be given. FIG. 6 is a flowchart showing a routine of the main processing at the slot machine 1. First, when power is supplied to the gaming machine 1, the main CPU 71 reads the game programs and game system program authenticated from the memory card 54 via the gaming board 50, and then, writes them in the RAM 73 (step 11 (Hereinafter, the word "Step" is abbreviated as "S")).

The main CPU 71 then performs an insurance selection process (S12). This process allows a player to select whether or not to enable insurance. The insurance selection process will be described later in detail, referring to FIG. 7.

The main CPU 71 then performs an initialization process when one game terminates (S13). For example, items of data needed to be erased, such as the number of BETs and determined symbols, are cleared on a game-by-game basis, in a work area of the RAM 73.

The main CPU 71 then performs a coin insertion/start check process (S14). In the process, input from the BET switch or the spin switch is checked. The coin insertion/start check process will be described later in detail, referring to FIG. 8.

The main CPU 71 then performs a symbol determination process (S15). In this process, symbols to be stopped (code numbers) are determined, based upon the random number values for determining symbols. The symbol determination process will be described later in detail, referring to FIG. 11.

The main CPU 71 then performs a process of determining the contents of effect rendering (S16). In this process, referring to the symbols to be stopped, that were determined in the symbol determination process of S15, the contents of effect rendering are determined based upon the random number values for effect rendering.

The main CPU 71 then performs a symbol rearrangement process (S17). In this process, the symbols to be stopped, that were determined in the symbol determination process of S15, are automatically rearranged in the display blocks 28 of the lower image display panel 141.

The main CPU 71 then performs a process of determining the number of coin-outs (S18). In this process, the number of coin-outs is determined based upon the number of identical symbols displayed in the display blocks 28, and the determined number is stored in the number-of-coin-outs counter provided in the RAM 73. The process of determining the number of coin-outs will be described later in detail, referring to FIG. 12.

Figure 15:
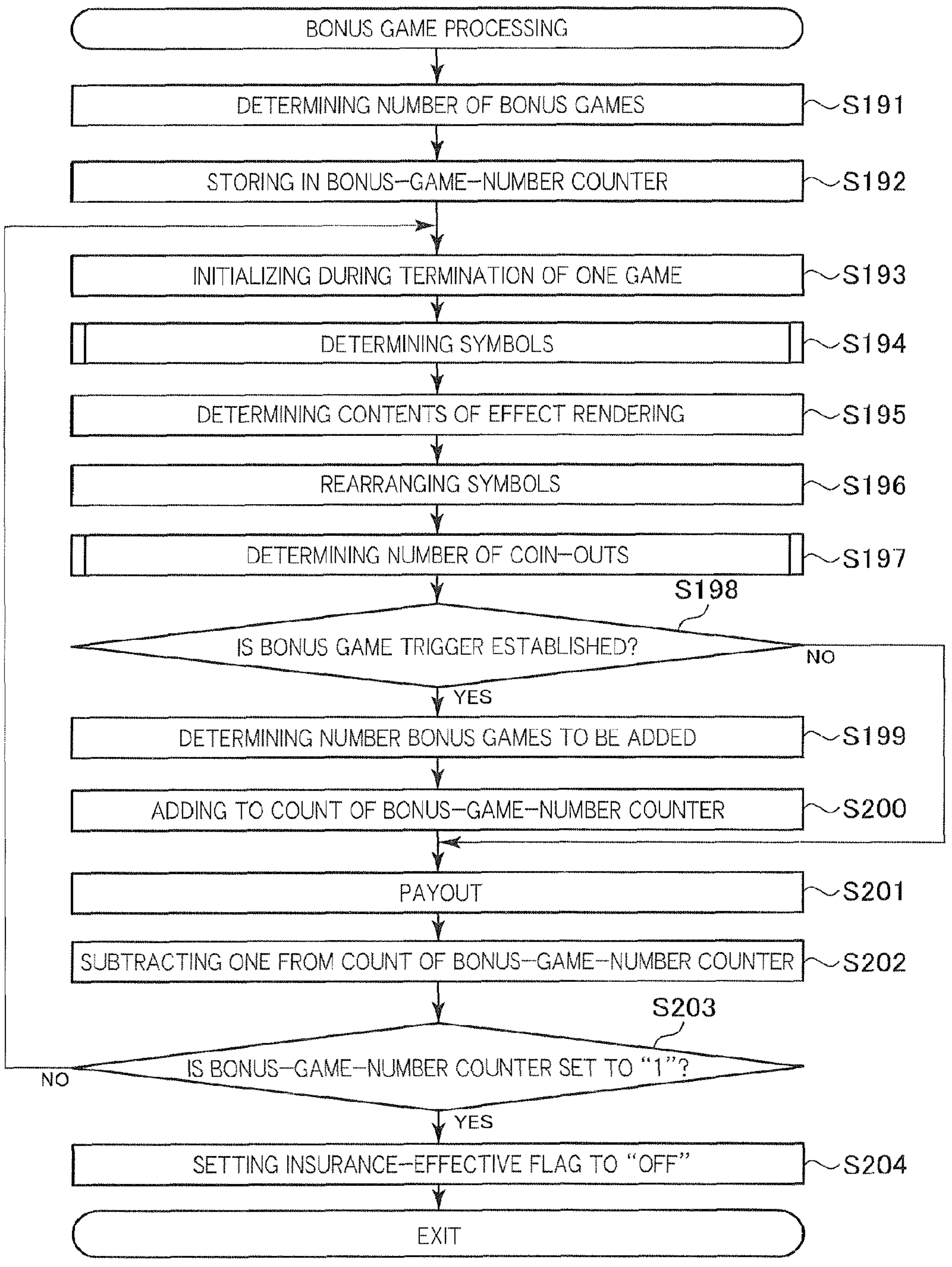
FIG. 15 is a flowchart showing a subroutine of bonus game processing.

The main CPU 71 then judges whether or not a bonus game trigger is established (S19). When the judgment result is affirmative, the main CPU 71 performs bonus game processing (S20). In this process, a program associated with the bonus game processing, which will be described later in detail referring to FIG. 15, is read, this program is performed next time and subsequently, and a bonus game is thereby started.

The main CPU 71 then performs an insurance check process (S21). Following the process of S20, or alternatively, upon judging that no bonus game trigger is established at S19, the main CPU 71 performs the insurance check process. The main CPU 71 checks whether or not the number of games for insurance has reached a threshold value, in a case where the insurance-effective flag to be described later is set to ON. Upon judging that the number of games for insurance has reached the threshold value, the main CPU 71 performs a process of paying out insurance or a process performing a sub game as a special game, based upon a player's selection result. The insurance check process will be described later in detail, referring to FIG. 13.

The main CPU 71 then performs a payout process (S22). In this process, basically, the value stored in the number-of-coin-outs counter is added to that of the amount-of-credit counter provided in the RAM 73. Also in this process, driving of a hopper 113 is controlled based upon an input of the CASHOUT switch 33S, whereby coins may be ejected from the coin-out opening 15A. Further, driving of a ticket printer 171 is controlled, whereby a barcode-attached ticket may be issued. After this process has been performed, the routine reverts to S12.

Figure 7:
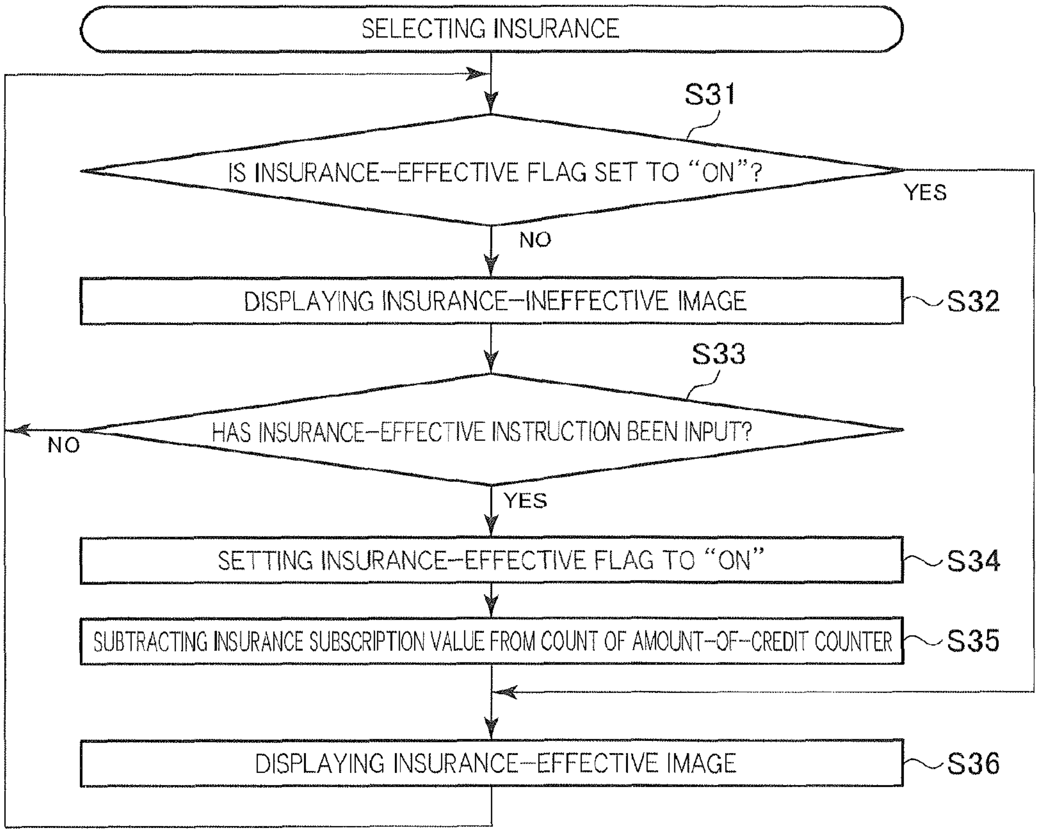
FIG. 7 is a flowchart showing a subroutine of an insurance selection process.

Next, an insurance selection process will be described. FIG. 7 is a flowchart showing a subroutine of the insurance selection process. First, the main CPU 71 judges whether or not an insurance-effective flag is set to ON (S31). When the judgment result is negative, the main CPU 71 displays an insurance-ineffective image (S32). The main CPU 71 then transmits a command of displaying the insurance-ineffective image to a graphic board 130. Based on the command, the graphic board 130 generates the insurance-ineffective image and displays the image to the lower image display panel 141.

As the insurance-ineffective image, for example, an image indicating "INSURANCE BET $1.00 TOUCH TO BET" is displayed. This image is intended for prompting a player to select whether or not insurance is enabled and for notifying to the player the amount required to enable insurance. The player can input an instruction of enabling insurance by touching a predetermined site on the touch panel 114.

The main CPU 71 then judges whether or not an insurance-effective instruction is input (S33). When the judgment result is negative, the main CPU 71 reverts to S31 while the insurance-effective flag is set to OFF. On the other hand, when the judgment result is affirmative, the insurance-effective flag is set to ON (S34).

The main CPU 71 then subtracts an insurance subscription value from a current value of the amount-of-credit counter (S35). In the embodiment, for example, a value equivalent to one dollar is subtracted from the current value of the amount-of-credit counter. The main CPU 71 then displays an insurance-effective image (S36). In other words, following the process at S35 or upon judging that the insurance-effective flag is set to ON at S31, the main CPU 71 displays the insurance-effective image.

As the insurance-effective image, for example, an image showing "INSURANCE CONTINUED WIN 200 CREDIT" is displayed. This image is intended to notify to a player that insurance is effective and that, when the insurance condition is met, a value "200" is added to the current value of the amount-of-credit counter. When this process has been performed, the routine reverts to S31.

Figure 8:
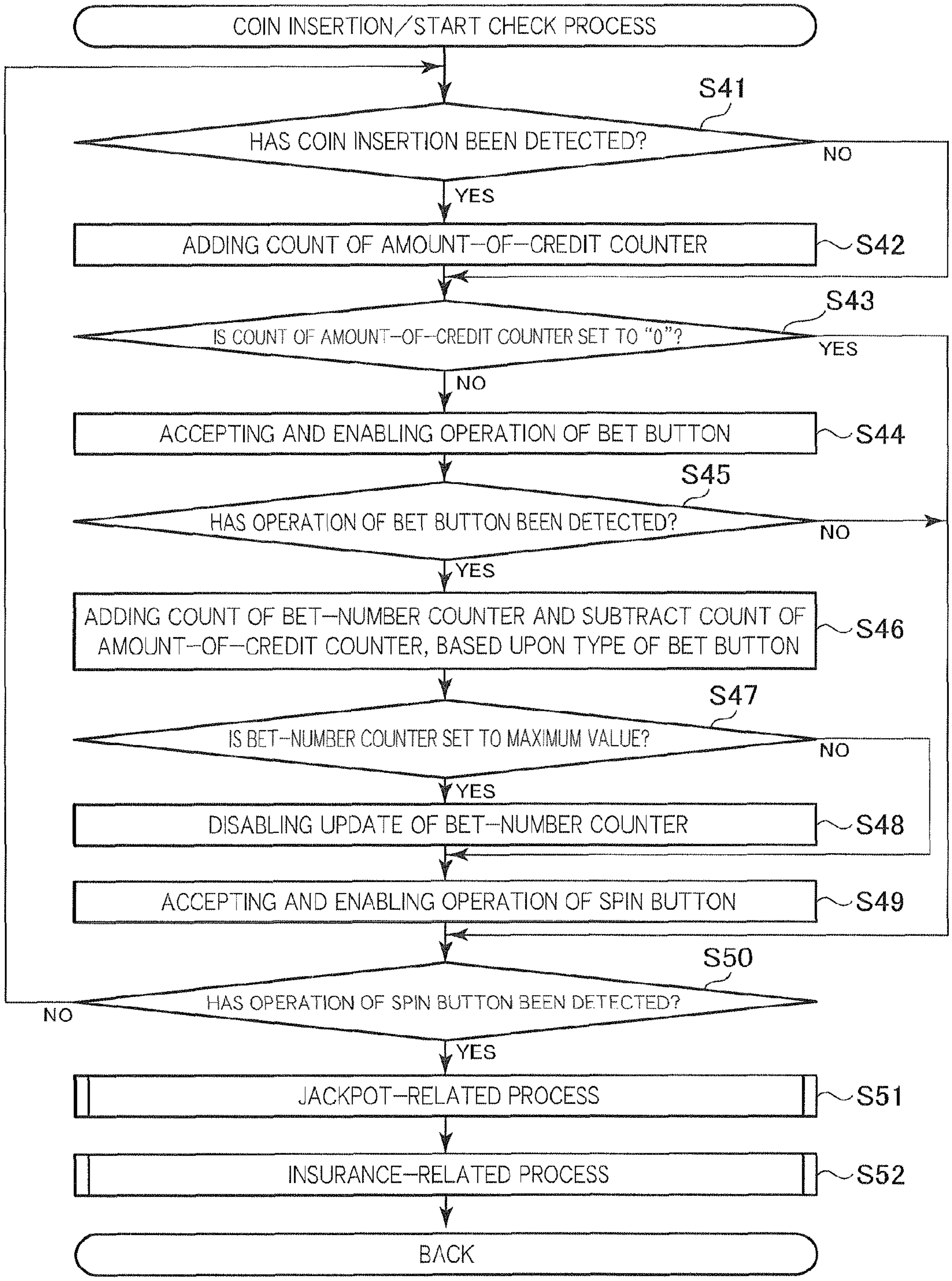
FIG. 8 is a flowchart showing a subroutine of a coin insertion/start check process.

Next, a coin insertion/start check process will be described. FIG. 8 is a flowchart showing a subroutine of the coin insertion/start check process. First, the main CPU 71 judges whether or not coin insertion has been detected by means of a coin counter 92C (S41). When the judgment result is affirmative, the main CPU 71 performs additive processing of the amount-of-credit counter (S42). In addition to coin insertion, a bill validator 115 judges whether or not bill insertion has been detected. When the judgment result is affirmative, a value corresponding to the amount of bill may be added to the current value of the amount-of-credit counter.

Next, the main CPU 71 judges whether or not the amount-of-credit counter is set to 0 (S43). In other words, following the process of S42 or upon judging that no coin insertion has been detected at S41, the main CPU 71 judges whether or not the amount-of-credit counter is set to 0. Upon judging that the counter is not set to 0, the main CPU 71 enables acceptance of operation of a BET button (S44).

The main CPU 71 then judges whether or not an operation of the BET button has been detected by means of the BET switch (S45). When the judgment result is affirmative, the main CPU 71 performs additive processing of the number-of-BETs counter provided in the RAM 73 or performs subtractive processing of the amount-of-credit counter, based upon a type of the BET button (S46).

The main CPU 71 then judges whether or not the number-of-BETs counter is the largest (S47). When the judgment result is affirmative, the main CPU 71 disables updating of the number-of-BETs counter (S48). The main CPU 71 then enables acceptance of operation of the SPIN button (S49). In other words, following the process of S48 or when the judgment result is negative at S47, the main CPU 71 enables acceptance of operation of the SPIN button.

The main CPU 71 then judges whether or not the operation of the SPIN button 31 has been detected (S50). In other words, following the process at S49, when the judgment result is negative at S45, or alternatively, when the judgment result is affirmative at S43, the main CPU 71 judges whether or not the operation of the SPIN button 31 has been detected. When the judgment result is negative, the main CPU 71 reverts to S41.

Alternatively, when the result is affirmative, the main CPU 71 performs a jackpot-related process (S51). The jackpot-related process will be described later in detail, referring to FIG. 9. The main CPU 71 performs an insurance-related process (S52). The insurance-related process will be described later in detail, referring to FIG. 10. After the process has been conducted, the coin-insertion/start-check process is completed.

Figure 9:
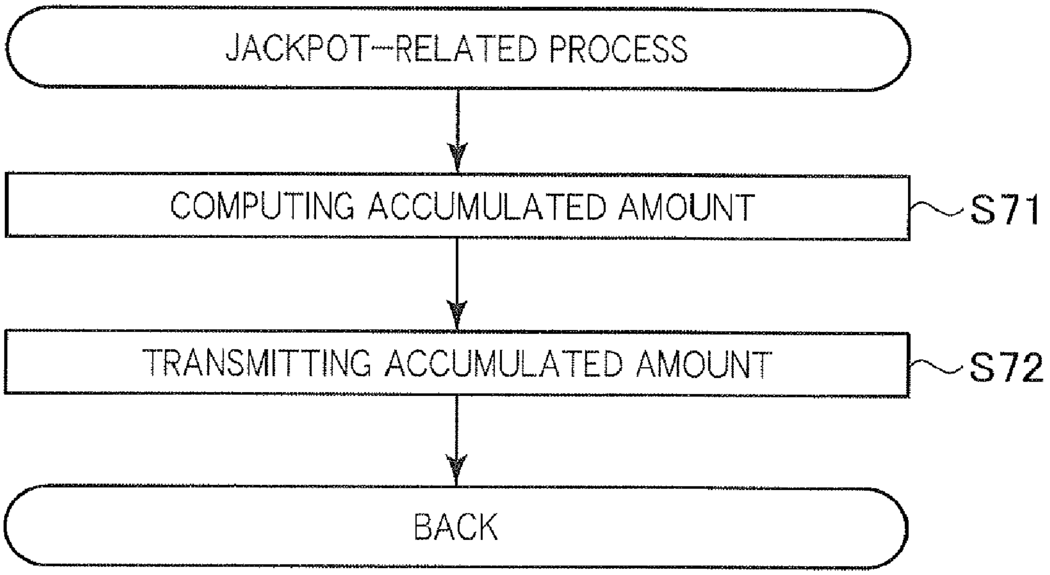
FIG. 9 is a flowchart showing a subroutine of a jackpot-related process.

Next, a description of the jackpot-related process will be given. FIG. 9 is a flowchart showing a subroutine of the jackpot-related process. First, the main CPU 71 computes an accumulated amount (S71). In this process, a product between a value of the number-of-BETs counter and a preset accumulation rate is obtained, and an accumulated amount for a jackpot amount is computed.

The main CPU 71 transmits the computed accumulated amount to the external control unit (S72). Upon receipt of the accumulated amount, the external control unit updates the amount of jackpot. After the process has been conducted, the jackpot-related process is completed.

Figure 10:
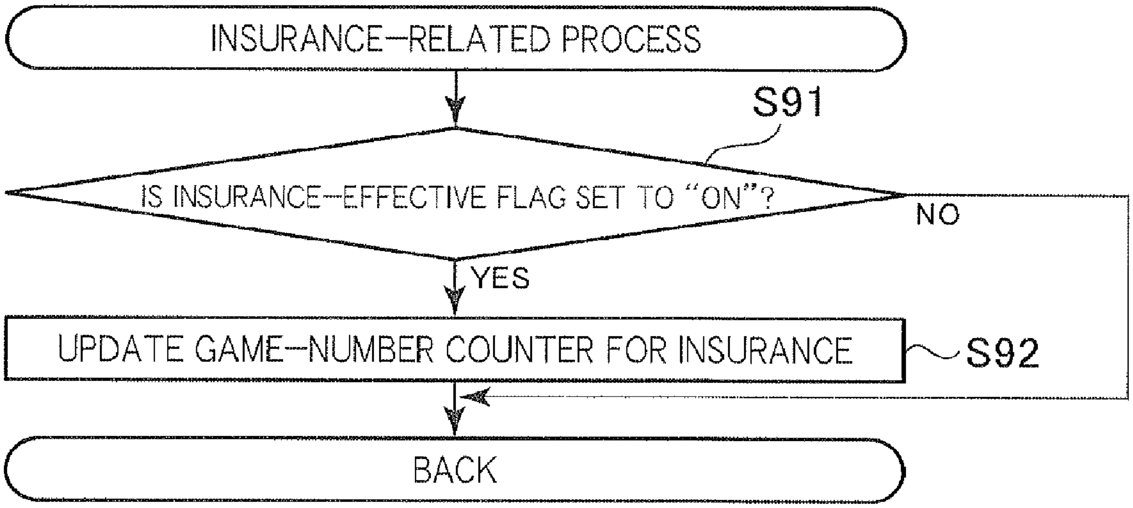
FIG. 10 is a flowchart showing a subroutine of an insurance-related process.

Next, a description of the insurance-related process will be given. FIG. 10 is a flowchart showing a subroutine of the insurance-related process. First, the main CPU 71 judges whether or not the insurance-effective flag is set to ON (S91). The insurance-effective flag is set to ON when the player's operation of an insurance BET button 37 has been detected at S34 at which the insurance selection process described in FIG. 7 is performed.

Upon judging that the insurance-effective flag is not set to ON, the main CPU 71 terminates the insurance-related process. On the other hand, upon judging that the insurance-effective flag is set to ON, the main CPU 71 updates the number-of-games counter for insurance that is provided in the RAM 73 (S92). The number-of-games counter for insurance is intended to manage the number of games performed when or after the insurance-effective flag has been set to ON, and the current value is added on a one-by-one increment basis in the process of S92 described previously. After the process has been conducted, the insurance-related process is completed.

Figure 11:
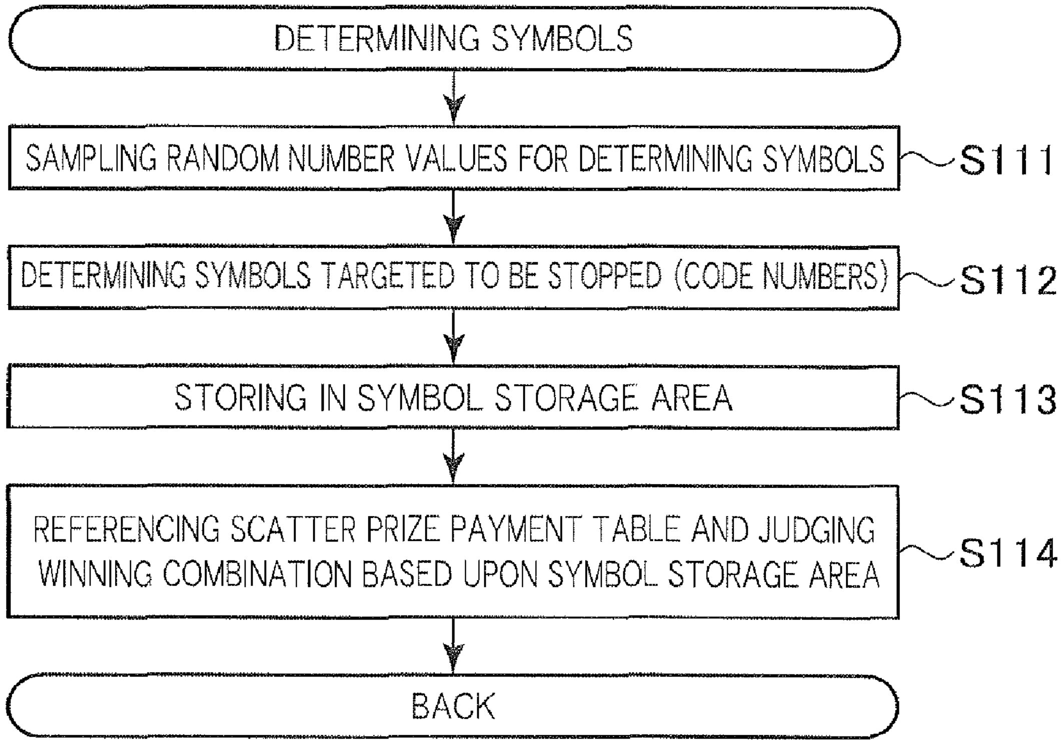
FIG. 11 is a flowchart showing a subroutine of a symbol determination process.

Next, a description of the symbol determination process will be given. FIG. 11 is a flowchart showing a subroutine of a symbol determination process. First, the main CPU 71 samples random number values for determining symbols (S111). Specifically, the main CPU 71 selects five random number values corresponding to a respective one of (five) symbol columns, from the numeric range from 0 to 255, by executing a random number generation program included in symbol determination programs. The present embodiment describes a case of generating random numbers in a programmable fashion (a case of using so called software random numbers). In the present invention, however, a random number generator is provided, whereby random numbers may be sampled from the random number generator (so called hardware random numbers may be used).

The main CPU 71 then determines symbols (code numbers) to be stopped (S112. See FIG. 3). Code Nos. of symbol columns correspond to those of symbols displayed in a stopped state in the display blocks 28. The main CPU 71 determines a prize by determining code numbers for symbol columns, respectively. As shown in FIG. 3, for example, if the main CPU 71 determines code Nos. of the symbols to be "00", "01", "02", "03", "04", the winning prize is determined to be "EARTH".

The main CPU 71 then stores the determined symbols to be stopped, in a symbol storage area provided in the RAM 73 (S113). Referring to the scatter prize payment table (FIG. 4), the main CPU 71 then judges a scatter prize, based upon the symbol storage area (S114).

Figure 12:
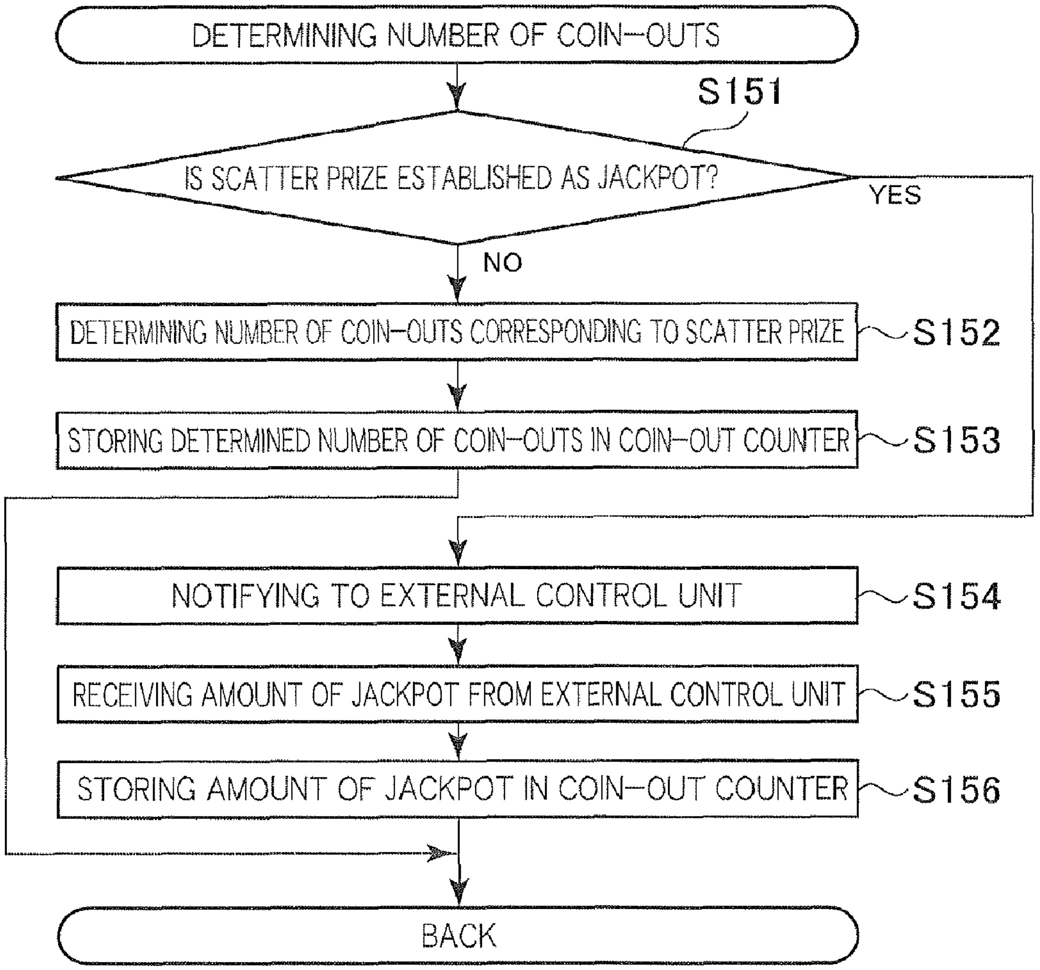
FIG. 12 is a flowchart showing a subroutine of a process of determining the number of coin-outs.

Next, a process of determining the number of coin-outs will be described. FIG. 12 is a flowchart showing a subroutine of the process of determining the number of coin-outs. First, the main CPU 71 judges whether or not a scatter prize is realized as a jackpot (S151). When the judgment result is negative, the main CPU 71 determines the number of coin-outs corresponding to the scatter prize (S152). For example, if three, four, or five "MERCURY" symbols are displayed in a stopped state in any of the display blocks 28, 10, 20, or 30 coins are paid out. (The number of coin-outs is computed as per one coin insertion.) (See FIG. 4.) When a so called "loser" is established, "0" is determined as the number of coin-outs. The main CPU 71 then stores the determined number of coin-outs in the number-of-coin-outs counter (S153). After this process has been performed, the process of determining the number of coin-outs is terminated.

Upon judging that a scatter prize is realized as a jackpot, the main CPU 71 notifies to an external control unit that a winning jackpot is established (S154). Upon receipt of the notification, the external control unit exercising control of a plurality of gaming machines 1 transmits to the gaming machines 1 the amount of jackpot that has been updated so far. At this time, while part of the amount of jackpot (for example, 80%) is targeted to be transmitted, the remainder thereof may be repeated for the establishment of a jackpot trigger.

The main CPU 71 then receives the amount of jackpot from the external control unit (S155). The main CPU 71 then stores the received amount of jackpot in the number-of coin-outs counter (S156). After this process has been performed, the process of determining the number of coin-outs is terminated.

Figure 13:
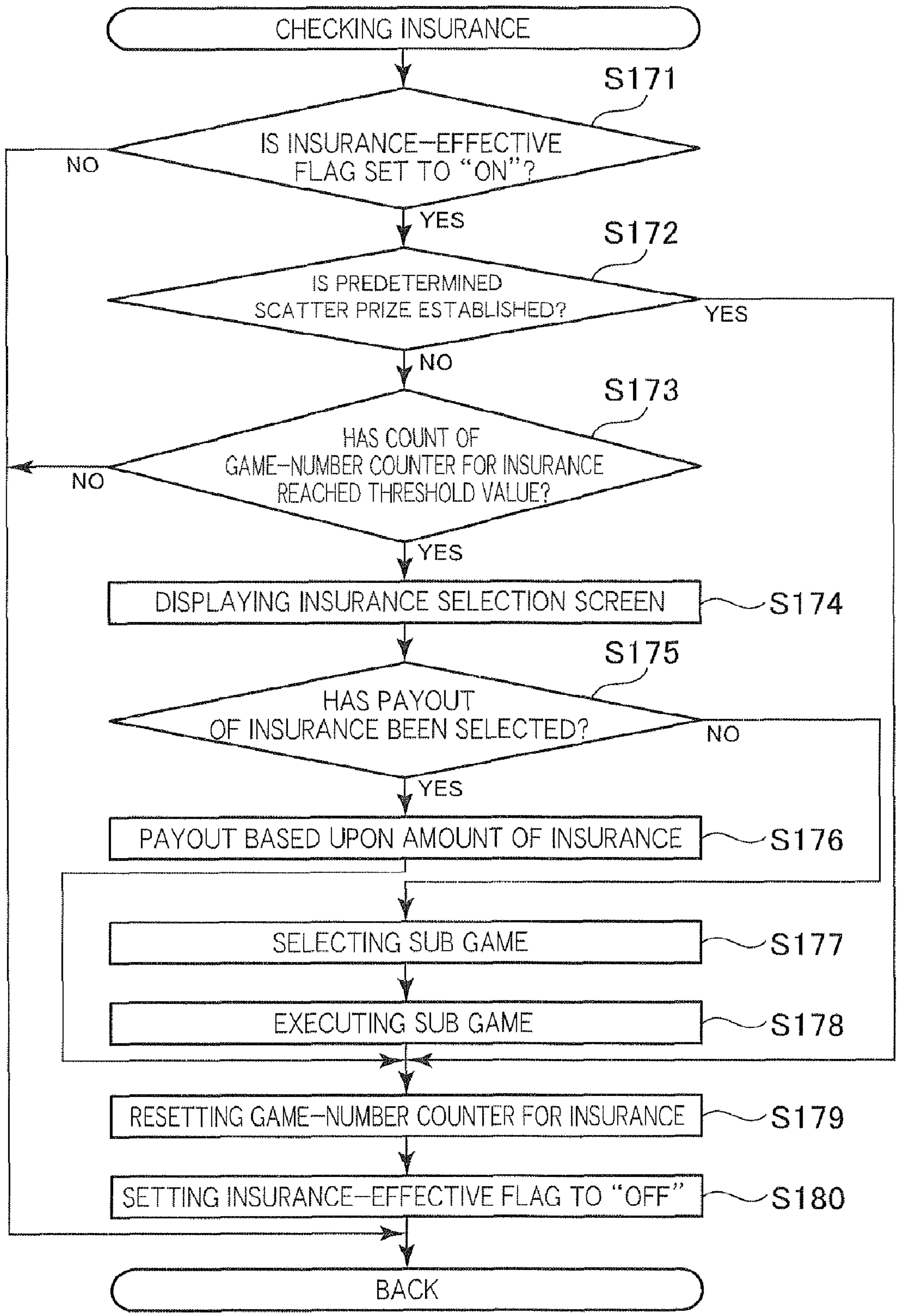
FIG. 13 is identical to FIG. 1, and is a flowchart showing a subroutine of an insurance check process.
Figure 14A:
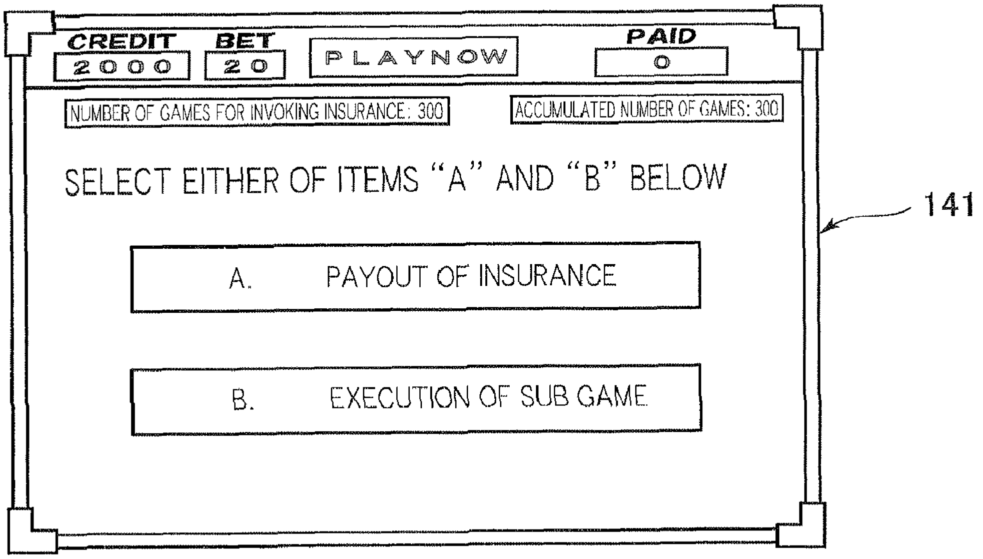
FIGS. 14A and 14B are views showing an exemplary display of a lower image display panel.
Figure 14B:
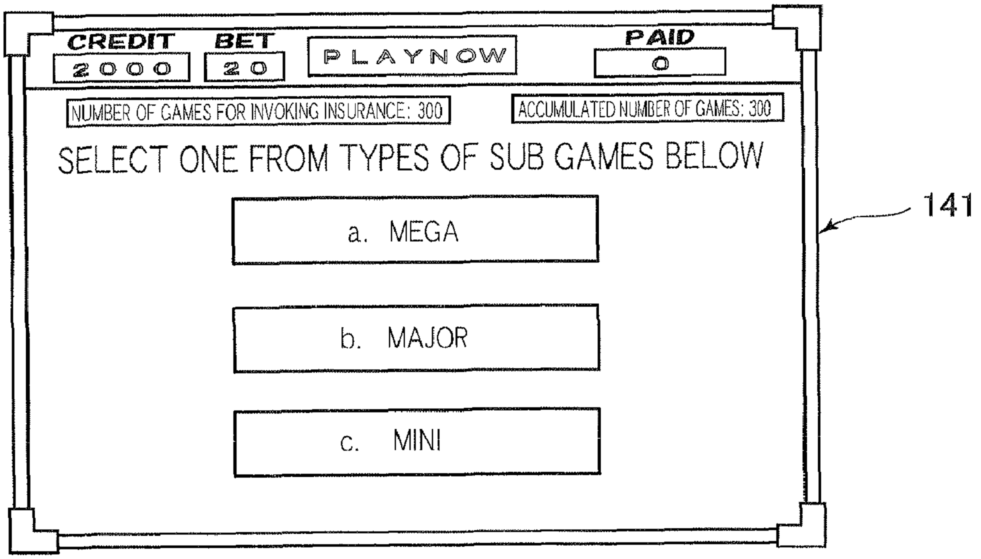

Next, an insurance check process will be described. FIG. 13 is identical to FIG. 1, and is a flowchart showing a subroutine of the insurance check process. FIGS. 14A and 14B are views each showing an exemplary display of the lower image display panel 141.

First, the main CPU 71 judges whether or not the insurance-effective flag is set to ON (S171). When the judgment result is negative, the main CPU 71 terminates the insurance check process.

When the judgment result is affirmative, the main CPU 71 judges whether or not a predetermined scatter prize is established (S172). In the embodiment, the predetermined scatter prizes include a "Bonus Game Trigger" and a "Jackpot". Specifically, the Bonus Game Trigger is established when three or more "EARTH" symbols are displayed (rearranged) in a stopped state in any of the display blocks 28 of the lower image display panel 141.

Upon judging that the predetermined scatter prize is not established, the main CPU 71 judges whether or not a game-number counter for insurance reaches a threshold value (for example, 300) (S173). When the judgment result is negative, the main CPU 71 terminates the insurance check process.

When the judgment result is affirmative, the main CPU 71 performs a process of displaying an insurance selection screen (S174). Specifically, as shown in FIG. 14A, the main CPU 71 performs a process for the lower image display panel 141 to display a screen prompting a player to select an item "A. Payout of Insurance" or an item "B. Execution of a Sub Game". A player inputs a selection of A or B by touching either of them on a touch panel 114. For example, the player touches the selection item "A. Payout of Insurance" to select payout of insurance or touches the selection item "B. Execution of a Sub Game" to execute a sub game.

Next, the main CPU 71 judges whether or not the payout of insurance has been selected (S175). When the judgment result is affirmative, the main CPU 71 performs a payout process, based upon the amount of insurance (S176). In the embodiment, a predetermined amount (for example, 200) is specified as the amount of insurance, and the specified amount is added to a current value of an amount-of-credit counter.

When it is judged that the payout of insurance is not selected (that execution of a sub game has been selected), the main CPU 71 performs a sub game selection process (S177). Specifically, the main CPU 71 causes the lower image display panel 141 to display a screen prompting a player to select any one of three types of sub games, as shown in FIG. 14B. The lower image display panel 141 displays a screen prompting a player to select any one of "a. MEGA", "b. MAJOR", and "c. MINI". The player inputs any one of the selections "a", "b", and "c" by touching any one of them on the touch panel 114. The contents of sub games "a. MEGA", "b. MAJOR", and "c. MINI" are different from each other.

The main CPU 71 then performs a process of executing a sub game (S178). Specifically, the main CPU 71 performs a process of executing a sub game of a type which was selected by the player at S177. After that, the main CPU 71 performs a process of paying out coins or the like, based upon an outcome of the executed sub game in the sub-game execution process.

Following the process of S176 or S178, the main CPU 71 resets the game-number counter for insurance (S179). The main CPU 71 then sets the insurance-effective flag to OFF (S180). After the process has been conducted, the insurance-check process is completed.

Next, a bonus game process will be described. FIG. 15 is a flowchart showing a subroutine of the bonus game process. First, the main CPU 71 determines the number of bonus games (S191). In the embodiment, a plurality of numbers such as "50", "70", and "100", for example, are specified as the number of bonus games, and any one of them is determined.

The main CPU 71 then stores the determined number of bonus games in a bonus-game-number counter provided in the RAM 73 (S192).

The main CPU 71 then performs an initialization process when one game terminates, like the aforementioned process of S13 shown in FIG. 6 (S193). The main CPU 71 then performs the aforementioned symbol determination process shown in FIG. 11 (S194). The main CPU 71 performs a process of determining the contents of effect rendering, like the aforementioned process of S16 shown in FIG. 6 (S195). The main CPU 71 then performs the aforementioned symbol rearrangement process of S17 shown in FIG. 6 (S196). The main CPU 71 then performs the aforementioned payout-amount determination process shown in FIG. 12 (S197).

The main CPU 71 then judges whether or not a bonus game trigger is established (S198). When the judgment result is affirmative, the main CPU 71 determines the number of bonus games to be added (S199). In this process, like the aforementioned process of S191, the number of bonus games is determined. The main CPU 71 then adds the determined number of bonus games to a current value of the bonus-game-number counter (S200).

The main CPU 71 then performs a payout process (S201). Following the process of S200 or upon judging that no bonus game trigger is established at S198, the main CPU 71 performs the payout process. In this process, the main CPU 71 adds the value of the payout-amount counter, stored in the payout-amount determination process of S197, to a current value of a payout-amount counter for bonus. The payout-amount counter for bonus is intended to manage a total amount of payout determined in a bonus game.

When the bonus game process terminates, the value stored in the payout-amount counter for bonus during the aforementioned payout process of S22 in FIG. 6, is added to a current value of the amount-of-credit counter provided in the RAM 73. Namely, a total amount of payout determined through a bonus game is collectively paid out. Coins may be ejected from a coin payout opening 15A or barcode-attached tickets may be issued.

The main CPU 71 then subtracts 1 from a current value of the bonus-game-number counter (S202). The main CPU 71 then judges whether or not the bonus-game-number counter is set to 0 (S203). When the judgment result is negative, the main CPU 71 reverts to S193. Alternatively, when the judgment result is affirmative, the main CPU 71 sets the insurance-effective flag to OFF, like the process of S180 shown in FIG. 13. After that, the bonus game is terminated. When the bonus game process terminates, the routine reverts to S21 of the aforementioned main control process shown in FIG. 6.

Figure 16:
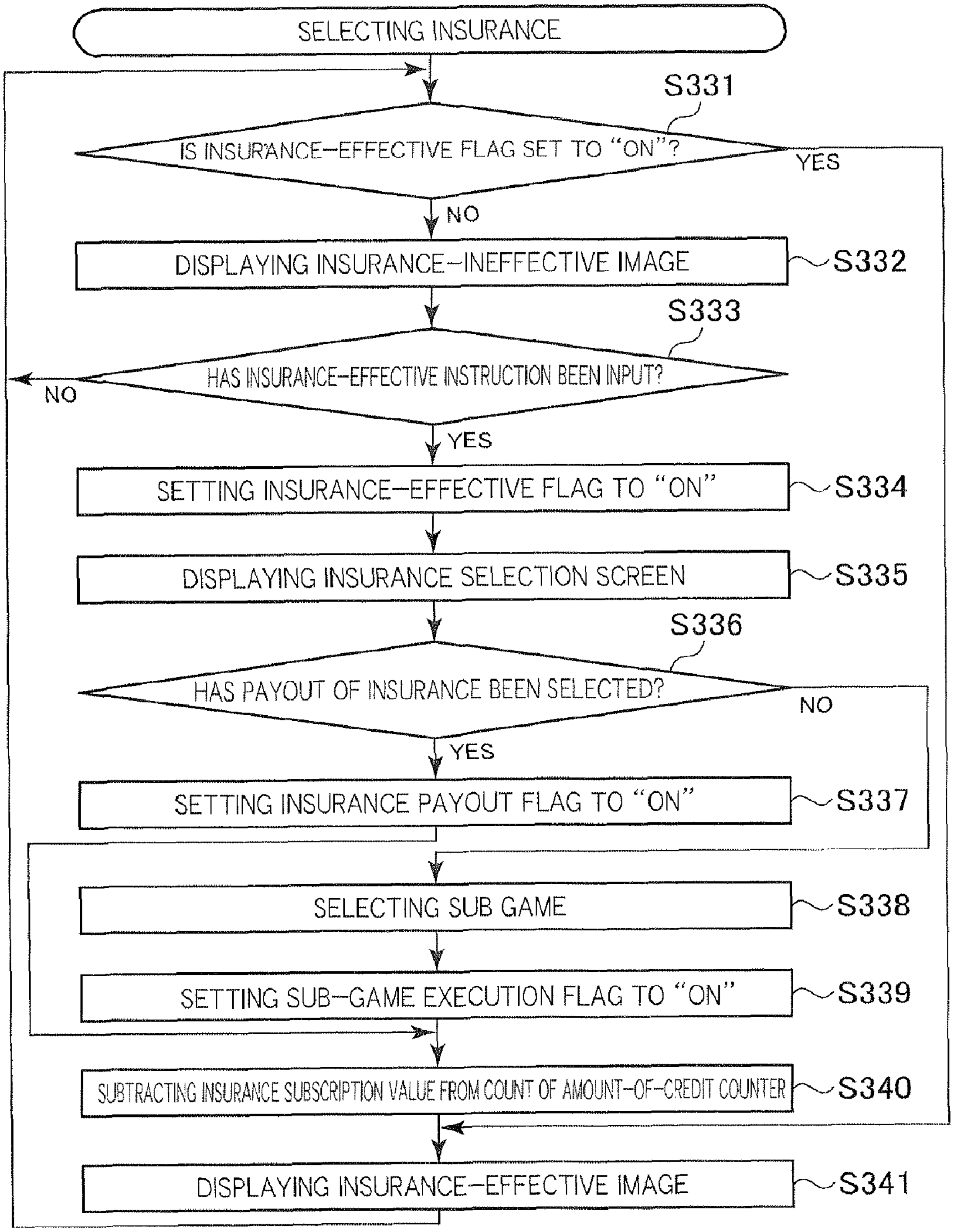
FIG. 16 is a flowchart showing a subroutine of an insurance selection process according to another embodiment.

FIG. 16 is a flowchart showing a subroutine of an insurance selection process according to another embodiment. The insurance selection process shown in FIG. 16 is different from the aforementioned one shown in FIG. 7 in that the payout of insurance or executing a sub game need to be selected when an accumulative value accumulated on a game-by-game basis (i.e., the number of games) has reached a predetermined value before a player executing a game. In other words, since the player makes this selection upon starting a game at a slot machine, a process "Payout of Insurance" or a process "Execution of a Sub Game" selected by a player is automatically performed when the accumulative value reaches a predetermined value. Therefore, only essential parts of the insurance selection process will be hereinafter described referring to FIG. 16.

First, at S331 to S334, the main CPU 71 performs a process of judging whether or not an insurance-effective flag is set to ON; a process for displaying an insurance-ineffective image; a process of judging whether or not an insurance-effective instruction has been input; and a process of setting the insurance-effective flag to ON. These processes of S331 to S334 are substantially identical to those of S31 to S34 shown in FIG. 7. Therefore, a duplicate description thereof is omitted.

At S335 and S336, the main CPU 71 then judges whether or not a process of displaying an insurance selection screen and the payout of insurance has been selected. The processes of S335 and S336 are substantially identical to those of S174 and S175 shown in FIG. 13. Therefore, a duplicate description thereof is omitted.

Upon judging that payout of insurance has been selected, the main CPU 71 sets an insurance payout flag to ON (S337). When the accumulative value accumulated on a game-by-game basis (the number of games) has reached a predetermined value, the main CPU 71 thereby performs the payout of insurance.

Upon judging that the payout of insurance has not been selected, the main CPU 71 performs a sub game selection process (S338). This process is substantially identical to that of S177 in FIG. 13. A duplicate description thereof is omitted.

The main CPU 71 then sets a sub game execution flag to ON (S339). Specifically, the main CPU 71 sets to ON a sub game execution flag corresponding to the sub game selected by a player at S338. When the accumulative value accumulated on a game-by-game basis (the number of games) has reached a predetermined value, the main CPU 71 thereby performs the sub game selected by the player at S338.

The main CPU 71 then performs a process of S340. In other words, following the process of S337 or S339, the main CPU 71 performs the process of S340. After that, the main CPU 71 performs a process of S341. In other words, upon judging that the insurance-effective flag is set to ON at S331 or following the process of S340, the main CPU 71 performs the process of S341. The processes of S340 and S341 are substantially identical those of S35 and S36 in FIG. 7. A duplicate description thereof is omitted.

While the above case described that a total of 15 symbols in 5 columns and 3 rows are displayed, the display format of symbols in the present invention is not limitative to that of 5 columns and 3 rows, and is applicable to a variety of display formats such as that of 3 columns and 3 rows. Further, while the above case described that symbols were displayed in a scrolling manner in each of the display block columns, each of these symbols may be individually displayed in a scrolling manner.

While the above-mentioned example described that the symbols were displayed in a scrolled manner with the use of a liquid crystal display device or the like, the present invention is not limitative thereto. In a case where mechanical reels are employed, the symbols may be expressed and displayed on the surfaces thereof.

While the abovementioned example described that, when the accumulative value reaches the predetermined value, payout of insurance or execution of a sub game can be selected, the present invention is not limitative thereto. A slot machine may be employed which is capable of selecting at least one of the payout descriptions of plural types of insurance or at least one of plural types of games.

While the abovementioned example described coin-out as the payout of insurance or the payout that is based upon an outcome of a sub game as a special game, the present invention is not limitative thereto. Another game such as a free game may be performed instead of such coin-out. Further, a slot machine may be employed which is capable of increasing or decreasing the number of free games according to the outcome of the sub game.

While the abovementioned example described that an accumulative number of games reach a predetermined value, the payout of insurance or the like is performed, the present invention is not limitative thereto. A slot machine may be employed which is capable of performing payout of insurance or the like when an accumulated number of points reached a predetermined value after points awarded in accordance with the outcome of a game executed has been accumulatively stored in a memory.

While the abovementioned example described that insurance BET is performed on a game-by-game basis, the present invention is not limitative thereto. A slot machine may be employed which is capable of executing a bonus game or a jackpot by performing a predetermined amount of insurance BET upon starting a game or making insurance effective until an accumulated value reaches a predetermined value.

While the embodiment according to the present invention has been described, the description presents only some of the specific examples and is not intended to limit the present invention in any way and specific constructions of each means and the like can be properly changed in terms of design. Moreover, the effects described in the embodiment of the present invention are only the most preferable effects generated from the present invention and the effects to be caused by the present invention is not limitative thereto.

What is claimed is:

1. A gaming machine, comprising:

(i) a display device on which plural types of symbols are arranged;

(ii) an insurance input section for setting an insurance function in a game;

(iii) a selection input section for a player to make a predetermined selection;

(iv) a memory which stores an accumulative value accumulated every game execution and a predetermined value for activating the insurance function; and (v) a controller, the controller being configured to:

(a) accept an insurance function setting request in the game, based upon an input from the insurance input section;

(b) rearrange the plural types of symbols on the display device;

(c) increment the accumulative value stored in the memory;

(d) judge whether a payout of a preset value for insurance or an execution of a special game has been selected by the player in response to an input from the selection input section by the player when the accumulative value stored in the memory so as to be accumulatively updated on a game-by-game basis has reached the predetermined value for activating the insurance function, as a result of repeating the processes (b) and (c) on the game-by-game basis, wherein a choice of the input is selected from the group consisting of the preset value for insurance and the exection of the special game; and (e) perform either of the payout of the preset value for the insurance and the execution of the special game, based upon a result of the judgment in the process (d).

2. The gaming machine according to claim 1, wherein:

the special game is included as one of a plurality of special games, and wherein:

when a judgment is made in the process (e), that the execution of the special game has been selected by the player, as a result of the judgment in the process (d), the controller determines whether to execute a predetermined special game from among the plurality of special games, in response to the input from the selection input section by the player, and executes a process of executing the determined special game.

3. The gaming machine according to claim 1, wherein:

the selection input section includes a selection input screen prompting the player to make a predetermined selection, and wherein:

when a judgment is made that the accumulative value stored in the memory so as to be accumulatively updated on the game-by-game basis has reached a predetermined value, as a result of the judgment in the process (d), the controller causes the display device to display a selection input screen prompting the player to select either of payout of the preset value for the insurance and the execution of the special game, and executes the process (e), based upon a selection input by the player from the selection input screen.

4. A gaming machine, comprising:

(i) a display device on which plural types of symbols are arranged;

(ii) an insurance input section for setting an insurance function in a game;

(iii) a selection input section for a player to make a predetermined selection;

(iv) a memory which stores a number of games to be accumulated every game execution and a predetermined number of games for activating the insurance function; and (v) a controller, the controller being configured to:

(a) accept an insurance function setting request in the game, based upon an input from the insurance input section;

(b) rearrange the plural types of symbols on the display device;

(c) increment the accumulative value stored in the memory;

(d) judge whether a payout of a preset value for insurance or an execution of a special game has been selected by the player, in response to an input from the selection input section by the player, when the number of games stored in the memory has reached the predetermined number of games for activating the insurance function, as a result of repeating the processes (b) and (c) on a game-by-game basis, wherein a choice of the input is selected from the group consisting of the the preset value for insurance and the exection of the special game; and (e) perform either of the payout of the preset value for the insurance and the execution of the special game, based upon a result of the judgment in the process (d).

5. The gaming machine according to claim 4, wherein:

the special game is included as one of a plurality of special games, and wherein:

when a judgment is made, in the process (e), that the execution of the special game has been selected, as a result of the judgment in the process (d), the controller determines whether to execute a predetermined special game from among the plurality of special games, in response to the input from the selection input section by the player, and executes a process of executing the determined special game.

6. The gaming machine according to claim 4, wherein:

the selection input section includes a selection input screen prompting the player to make a predetermined selection, and wherein:

when a judgment is made that the accumulative value stored in the memory so as to be accumulatively updated on the game-by-game basis has reached a predetermined value, as a result of the judgment in the process (d), the controller causes the display device to display a selection input screen prompting the player to select either of payout of the preset value for the insurance and the execution of the special game, and executes the process (e), based upon a selection input by the player from the selection input screen.

7. A gaming machine, comprising:

(i) a display device on which plural types of symbols are arranged and which includes a selection input screen causing a player to make a predetermined selection;

(ii) an insurance input section for setting an insurance function in a game;

(iii) a memory which stores an accumulative value accumulated every game execution and a predetermined value for activating the insurance function; and (iv) a controller, the controller being configured to:

(a) accept an insurance function setting request in the game, based upon an input from the insurance input section;

(b) cause the display device to display a selection input screen prompting the player to select either of payout of a preset value for insurance and execution of a special game;

(c) store in the memory an input result selectively input by the player from the selection input screen;

(d) rearrange the plural types of symbols on the display device;

(e) increment the accumulative value stored in the memory;

(f) judge whether or not the accumulative value stored in the memory so as to be accumulatively updated on a game-by-game basis has reached a predetermined value for activating the insurance function, as a result of repeating the processes (d) and (e) on the game-by-game basis, wherein a choice of the input result is selected from the group consisting of the preset value for insurance and the exection of the special game; and (g) when the accumulative value has reached the predetermined value, as a result of the judgment in the process (f), refer to the input result by request of the player stored in the memory in the process (c), and, based upon the input result, perform either of the payout of the preset value for the insurance and the execution of the special game.

8. The gaming machine according to claim 7, wherein:

the special game is included as one of a plurality of special games, and wherein:

when a judgment is made, in the process (g), that the input result by the request of the player stored in the memory in the process (c) is the execution of the special game, the controller determines whether to execute a predetermined special game from among the plurality of special games, in response to the input from the selection input section by the player, and performs a process of executing the determined special game.

* * * * *